United States Patent
Hsieh (10) Patent No.: US 10,887,653 B2
(45) Date of Patent: Jan. 5, 2021

(54) SYSTEMS AND METHODS FOR PERFORMING DISTRIBUTED PLAYBACK OF 360-DEGREE VIDEO IN A PLURALITY OF VIEWING WINDOWS

(71) Applicant: CyberLink Corp., Shindian (TW)

(72) Inventor: Kuo-Chiang Hsieh, New Taipei (TW)

(73) Assignee: CYBERLINK CORP., Shindian (TW)

( * ) Notice: Subject to any disclaimer, the term of this patent is extended or adjusted under 35 U.S.C. 154(b) by 464 days.

(21) Appl. No.: 15/715,280

(22) Filed: Sep. 26, 2017

(65) Prior Publication Data
US 2018/0091852 A1    Mar. 29, 2018

Related U.S. Application Data

(60) Provisional application No. 62/399,517, filed on Sep. 26, 2016.

(51) Int. Cl.
*G06F 3/048*    (2013.01)
*H04N 21/443*    (2011.01)
(Continued)

(52) U.S. Cl.
CPC ..... *H04N 21/4438* (2013.01); *H04N 21/2181* (2013.01); *H04N 21/21805* (2013.01);
(Continued)

(58) Field of Classification Search
CPC ......... H04N 21/4438; H04N 21/21805; H04N 21/2181; H04N 21/4314; H04N 21/4316;
(Continued)

(56) References Cited

U.S. PATENT DOCUMENTS 6,232,932 B1    5/2001    Thorner
6,266,085 B1    7/2001    Kato et al.
(Continued)

FOREIGN PATENT DOCUMENTS

CN    200993865 Y    12/2007
CN    103200357 A    7/2013
(Continued)

OTHER PUBLICATIONS

The Opera Machine. https://www.roh.org.uk/interactives/opera-machine (printed Sep. 21, 2017).

*Primary Examiner* — David Phantana-angkool
(74) *Attorney, Agent, or Firm* — McClure, Qualey & Rodack, LLP (57) ABSTRACT

A computing device for providing distributed playback of 360-degree video in a plurality of viewing windows receives a 360-degree video bitstream. The computing device receives a field of view angle for a main viewing window from a user. A user interface comprising the main viewing window and the plurality of peripheral viewing windows is generated, where the plurality of peripheral viewing windows each have a corresponding field of view angle. The computing device executes distributed playback of the 360-degree video in the main viewing window and the plurality of peripheral viewing windows based on the field of view angles of the main viewing window and the plurality of peripheral viewing windows.

22 Claims, 9 Drawing Sheets

(51) Int. Cl.
*H04N 21/81* (2011.01)
*H04N 21/431* (2011.01)
*H04N 21/472* (2011.01)
*H04N 21/218* (2011.01)
*H04N 21/6587* (2011.01)

(52) U.S. Cl.
CPC ..... *H04N 21/4314* (2013.01); *H04N 21/4316* (2013.01); *H04N 21/47217* (2013.01); *H04N 21/6587* (2013.01); *H04N 21/816* (2013.01)

(58) Field of Classification Search
CPC ......... H04N 21/47217; H04N 21/6587; H04N 21/816
USPC .......................................................... 715/719
See application file for complete search history.

(56) References Cited

U.S. PATENT DOCUMENTS

| | | | |
|---|---|---|---|
| 6,728,477 B1 | 4/2004 | Watkins | |
| 6,738,073 B2 | 5/2004 | Park et al. | |
| 7,145,947 B2 | 12/2006 | Koga | |
| 7,407,294 B2 | 8/2008 | Choi | |
| 7,974,444 B2 | 7/2011 | Hongo | |
| 8,447,173 B2 | 5/2013 | Jung et al. | |
| 9,036,001 B2 | 5/2015 | Chuang et al. | |
| 9,106,883 B2 | 8/2015 | Johnson et al. | |
| 9,305,365 B2 * | 4/2016 | Lovberg | G06T 7/248 |
| 9,787,958 B2 * | 10/2017 | Hattingh | H04N 9/3185 |
| 10,166,921 B2 * | 1/2019 | Sypitkowski | H04N 5/23238 |
| 10,219,026 B2 * | 2/2019 | Eim | G06F 3/04817 |
| 10,257,494 B2 * | 4/2019 | Sadi | H04N 13/243 |
| 10,281,570 B2 * | 5/2019 | Parker | H04K 3/00 |
| 10,327,708 B2 * | 6/2019 | Yu | G06T 7/74 |
| 10,462,343 B2 * | 10/2019 | McCain | H04N 5/2258 |
| 10,484,652 B2 * | 11/2019 | Hobby | H04B 1/385 |
| 10,491,796 B2 * | 11/2019 | Brav | H04N 21/21805 |
| 10,503,457 B2 * | 12/2019 | Dimitrov | G06F 3/1431 |
| 10,504,241 B2 * | 12/2019 | Singh | G06T 7/80 |
| 10,506,221 B2 * | 12/2019 | Kim | G06F 1/163 |
| 10,509,459 B2 * | 12/2019 | Lee | G06F 3/005 |
| 10,628,019 B2 * | 4/2020 | Parmar | G06F 3/04815 |
| 10,827,125 B2 * | 11/2020 | Lee | H04N 5/23254 |
| 2003/0113096 A1 | 6/2003 | Taira et al. | |
| 2007/0140663 A1 | 6/2007 | Ashley et al. | |
| 2007/0253677 A1 | 11/2007 | Wang | |
| 2010/0013738 A1 | 1/2010 | Covannon et al. | |
| 2011/0169867 A1 | 7/2011 | Kniffen et al. | |
| 2012/0002050 A1 * | 1/2012 | Taniguchi | G08G 1/167 348/148 |
| 2012/0169842 A1 * | 7/2012 | Chuang | G08B 13/19619 348/39 |
| 2013/0107048 A1 * | 5/2013 | Rottner | H04N 5/23238 348/148 |
| 2013/0181901 A1 | 7/2013 | West | |
| 2016/0044284 A1 * | 2/2016 | Goseberg | H04N 5/23238 348/148 |
| 2016/0173775 A1 * | 6/2016 | Lowry | H04N 5/23238 348/36 |
| 2017/0064374 A1 * | 3/2017 | Eim | G06F 3/04817 |
| 2017/0185851 A1 * | 6/2017 | Jeromin | G06K 9/00208 |
| 2018/0005443 A1 * | 1/2018 | Poulos | G06F 3/017 |
| 2018/0046363 A1 * | 2/2018 | Miller | G06F 3/04883 |
| 2018/0188801 A1 * | 7/2018 | Leppanen | G06F 3/017 |
| 2018/0332219 A1 * | 11/2018 | Corcoran | H04N 5/23267 |
| 2018/0332267 A1 * | 11/2018 | Hesla | H04N 13/161 |
| 2018/0359419 A1 * | 12/2018 | Hu | G03B 15/006 |
| 2019/0289337 A1 * | 9/2019 | Yan | H04N 21/431 |

FOREIGN PATENT DOCUMENTS

| | | |
|---|---|---|
| CN | 104735402 A | 6/2015 |
| GB | 2510986 B | 1/2015 |

* cited by examiner

SYSTEMS AND METHODS FOR PERFORMING DISTRIBUTED PLAYBACK OF 360-DEGREE VIDEO IN A PLURALITY OF VIEWING WINDOWS

CROSS-REFERENCE TO RELATED APPLICATION

This application claims priority to, and the benefit of, U.S. Provisional Patent Application entitled, "Systems and Methods for Performing Distributed Playback of 360-degree video in a Plurality of Viewing Windows," having Ser. No. 62/399,517, filed on Sep. 26, 2016, which is incorporated by reference in its entirety.

TECHNICAL FIELD

The present disclosure generally relates to systems and methods for performing distributed playback of 360-degree video in a plurality of viewing windows.

BACKGROUND

As smartphones and other mobile devices have become ubiquitous, people have the ability to capture video virtually anytime. Furthermore, 360-degree videos have gained increasing popularity.

SUMMARY

Systems and methods for performing distributed playback of 360-degree video in a plurality of viewing windows are disclosed. In a first embodiment, a computing device receives a 360-degree video bitstream. The computing device also receives a field of view angle for a main viewing window from a user. A user interface comprising the main viewing window and the plurality of peripheral viewing windows is generated, where the plurality of peripheral viewing windows each have a corresponding field of view angle. The computing device executes distributed playback of the 360-degree video in the main viewing window and the plurality of peripheral viewing windows based on the field of view angles of the main viewing window and the plurality of peripheral viewing windows.

Another embodiment is a system that comprises a memory device storing instructions and a processor coupled to the memory device. The processor is configured by the instructions to receive a 360-degree video bitstream and receive a field of view angle for a main viewing window from a user. The processor is further configured to generate a user interface comprising the main viewing window and the plurality of peripheral viewing windows, the plurality of peripheral viewing windows each having a corresponding field of view angle. The processor is further configured to execute distributed playback of the 360-degree video in the main viewing window and the plurality of peripheral viewing windows based on the field of view angles of the main viewing window and the plurality of peripheral viewing windows.

Another embodiment is a non-transitory computer-readable storage medium storing instructions to be implemented by a computing device having a processor. The instructions, when executed by the processor, cause the computing device to receive a 360-degree video bitstream and receive a field of view angle for a main viewing window from a user. The processor is further configured to generate a user interface comprising the main viewing window and the plurality of peripheral viewing windows, the plurality of peripheral viewing windows each having a corresponding field of view angle. The processor is further configured to execute distributed playback of the 360-degree video in the main viewing window and the plurality of peripheral viewing windows based on the field of view angles of the main viewing window and the plurality of peripheral viewing windows.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

An increasing number of digital capture devices are capable of recording 360 degree video (hereinafter "360-degree video"). The creation of 360-degree video generally involves capturing a full 360 degree view using multiple cameras, stitching the captured views together, and encoding the video. However, when viewing 360-degree video, users are typically limited to viewing content in the field of view angle associated with the playback window and then navigating the 360-degree video using a dial component or other user interface component.

Various embodiments are disclosed for providing users with a plurality of viewing windows for playback of a 360-degree video where the plurality of viewing windows provide the user with an improved way of viewing the 360-degree video, thereby providing the user with a fully immersive experience. Specifically, various embodiments provide an improved mechanism for viewing 360-degree video by providing a virtual rear-view mirror effect whereby the user can view content (straight ahead) while at the same time viewing content behind the user without panning rearward. The combined field of view angles provided by the plurality of viewing windows may collectively provide a combined field of view of less than 360 degrees or greater than 360 degrees, as described in more detail below. For instances where the combined field of view angles is greater than 360 degrees, the field of views of two or more of the viewing windows at least partially overlap. In accordance with exemplary embodiments, the content displayed in the main viewing window and in the peripheral windows originates from a common source (e.g., a 360-degree camera).

To capture 360-degree video, multiple cameras are typically placed in the same location to obtain separate bitstreams from different points of view where the bitstreams are then stitched together to form a 360-degree video. The different bitstreams correspond to the same 360-degree video content. Note that this is in contrast to other configurations where different cameras are positioned at various locations and configured to capture digital content independently of the other cameras. In accordance with various embodiments, when the user adjusts the field of view associated with a first viewing window (e.g., a main viewing window), the field of view of each of the remaining windows is adjusted accordingly. Furthermore, in accordance with various embodiments, the user is able to specify a field of view angle for each viewing window for purposes of playback distribution among the plurality of viewing windows.

Figure 1:
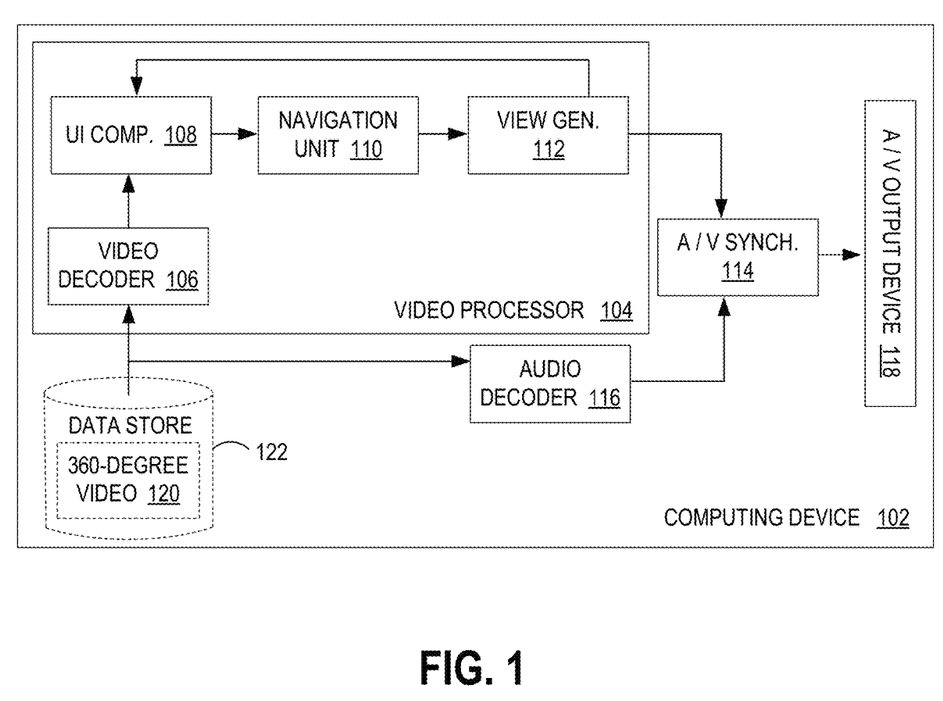
FIG. 1 is a block diagram of a computing device in which distributed playback of 360-degree video in a plurality of viewing windows may be implemented in accordance with various embodiments.

A description of a system for implementing the distributed playback techniques disclosed herein is now described followed by a discussion of the operation of the components within the system. FIG. 1 is a block diagram of a computing device 102 in which the algorithms disclosed herein may be implemented. The computing device 102 may be embodied as a computing device equipped with digital content recording capabilities, where the computing device 102 may include, but is not limited to, a digital camera, a smartphone, a tablet computing device, a digital video recorder, a laptop computer coupled to a webcam, and so on.

For some embodiments, the computing device 102 may be equipped with a plurality of cameras where the cameras are utilized to directly capture digital media content comprising 360 degree views. In accordance with such embodiments, the computing device 102 further comprises a stitching module (not shown) configured to process the 360 degree views. Alternatively, the computing device 102 may obtain 360-degree video from other digital recording devices. For example, the computing device 102 may also be configured to access one or more content sharing websites hosted on a server via a network to retrieve digital media content.

As one of ordinary skill will appreciate, the digital media content may be encoded in any of a number of formats including, but not limited to, Motion Picture Experts Group (MPEG)-1, MPEG-2, MPEG-4, H.264, H.265, Third Generation Partnership Project (3GPP), 3GPP-2, Standard-Definition Video (SD-Video), High-Definition Video (HD-Video), Digital Versatile Disc multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), Full HD, Ultra HD, 8K or any number of other digital formats.

The computing device 102 includes a video processor 104 for generating a plurality of viewing windows and for executing distributed playback of a 360-degree video using the plurality of viewing windows. The video processor 104 includes a video decoder 106 configured to process an incoming 360-degree video 120 stored in a data store 122 of the computing device 102. The video processor 104 further comprises a user interface (UI) component 108 configured to render the plurality of viewing windows for display. The UI component 108 is further configured to obtain user input comprising a field of view angle for a main viewing window and/or each of a plurality of peripheral viewing windows. For some embodiments, the field of view angle of the main viewing window may be specified as a ratio relating to the field of view angles for each of the main viewing window and the peripheral viewing windows, where distribution of playback of the 360-degree video is executed based on the specified ratio. For example, the user may elect to have a field of view angle of 180 degrees for the main viewing window while two peripheral windows each have a field of view angle equal to half the field of view angle of the main viewing window, thereby providing a full 360 degree view.

The video processor 104 further comprises a navigation unit 110 for receiving navigation data generated by the user. In some embodiments, the UI component 108 may generate a user interface whereby the user is provided with a dial component for panning to the right, left, up, down, etc. The user generates navigation data using the dial component in the user interface. Based on the generated navigation data and specified field of view angles for the various viewing windows, the view generator 112 in the video processor 104 distributes the decoded 360-degree video bitstream to each of the main viewing window and peripheral viewing windows, wherein the content in each of the windows is displayed simultaneously. The video bitstream output by the view generator 112 is received by an audio/video (A/V) synchronizer 114 in the computing device 102. The A/V synchronizer 114 synchronizes the video content with audio content generated by the audio decoder 116 and outputs the content to an A/V output device 118.

Figure 2:
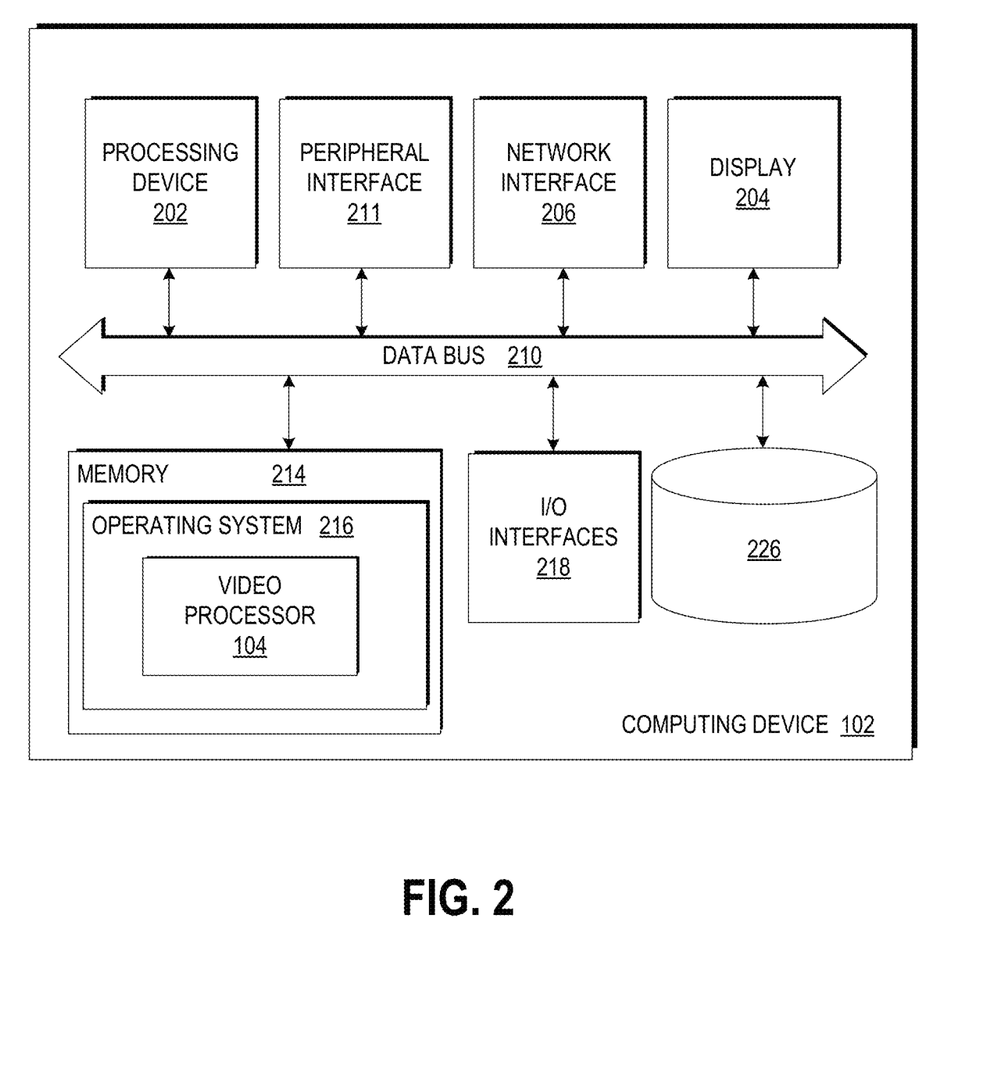
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 218, a network interface 206, a display 204, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 218 provide any number of interfaces for the input and output of data. For example, where the computing device 102 comprises a personal computer, these components may interface with one or more user input/output interfaces, which may comprise a keyboard or a mouse, as shown in FIG. 2. The display 204 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
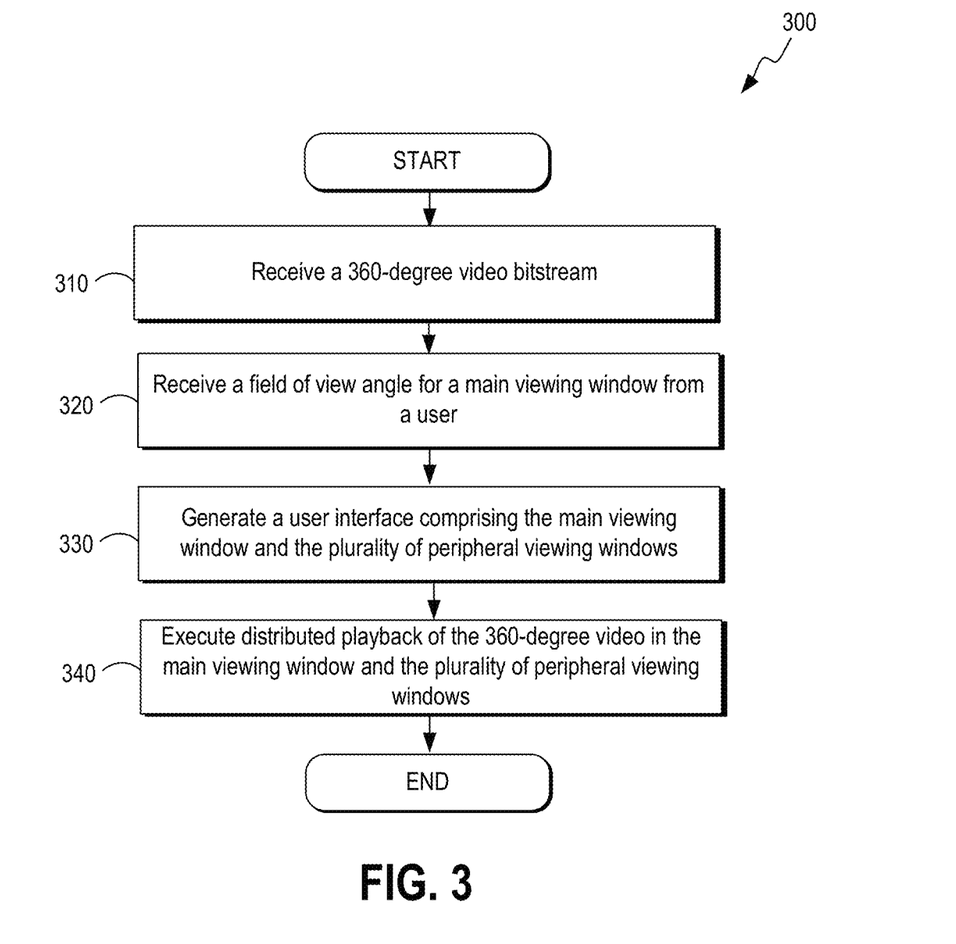
FIG. 3 is a flowchart for performing distributed playback of 360-degree video in a plurality of viewing windows utilizing the computing device of FIG. 1 in accordance with various embodiments.

Reference is made to FIG. 3, which is a flowchart in accordance with various embodiments for providing distributed playback of 360-degree video performed by the computing device 102 of FIG. 1. It is understood that the flowchart of FIG. 3 provides merely an example of the different types of functional arrangements that may be employed to implement the operation of the various components of the computing device 102. As an alternative, the flowchart of FIG. 3 may be viewed as depicting an example of steps of a method implemented in the computing device 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, a 360-degree video bitstream is received by the computing device 102 (FIG. 1). In block 320, a field of view angle for a main viewing window is received from a user. In block 330, a user interface comprising the main viewing window and the plurality of peripheral viewing windows is generated, where the plurality of peripheral viewing windows each have a corresponding field of view angle. In some embodiments, the field of view angles corresponding to the plurality of peripheral viewing windows are specified by the user. In some embodiments, the field of view angles corresponding to the plurality of peripheral viewing windows can be automatically assigned based on a ratio between a field of view angle of the main viewing window and a combined field of view angle of the peripheral viewing windows, where the ratio may be specified by the user or set by the computing device 102. In some embodiments, the peripheral viewing windows have different field of view angles. In other embodiments, the peripheral viewing windows have the same field of view angles, where the field of view angles of the peripheral viewing windows are set based on a default value selected by the computing device.

In block 340, the computing device executes distributed playback of the 360-degree video in the main viewing window and the plurality of peripheral viewing windows based on the field of view angles of the main viewing window and the plurality of peripheral viewing windows. In some embodiments, a modified field of view angle for the main viewing window is received by the computing device 102, where the modified field of view angle corresponds to a change in the field of view in either the horizontal direction or in the vertical direction. When a modified field of view angle is received by the computing device 102, the field of view angles for the peripheral viewing windows are automatically adjusted based on the modified field of view angle and the ratio previously specified by the user. Thereafter, the process in FIG. 3 ends.

Figure 4:
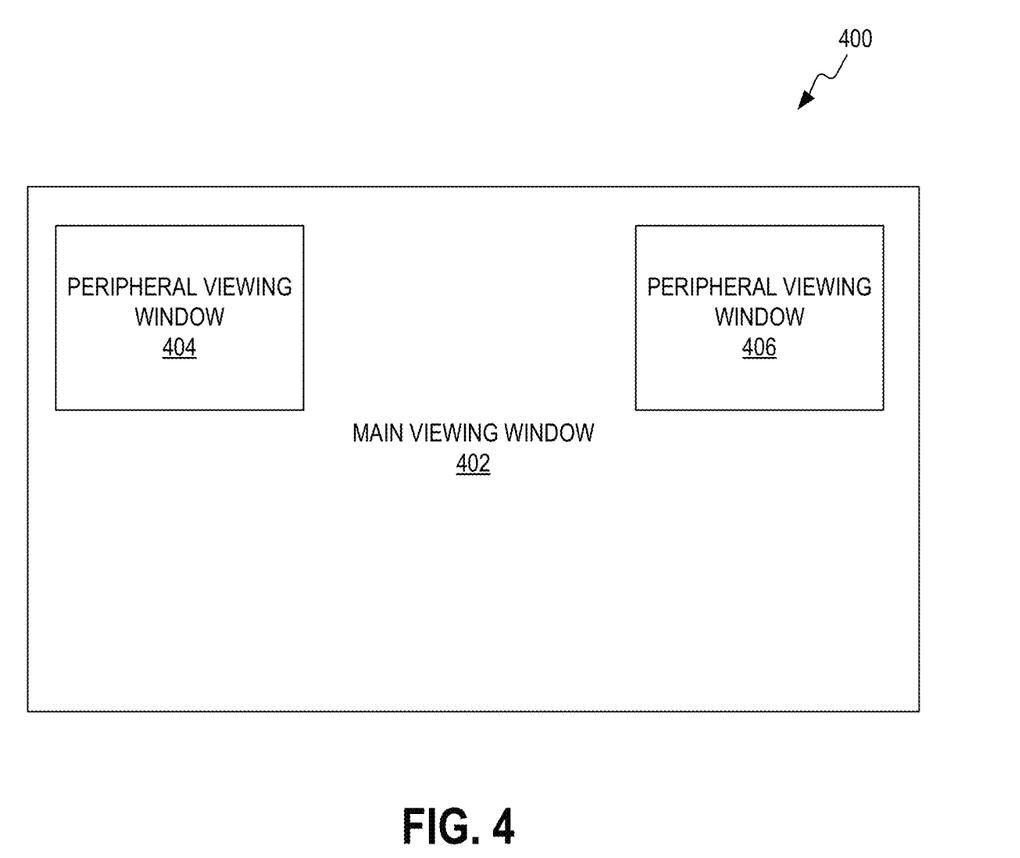
FIG. 4 illustrates an example layout comprising a main viewing window and two peripheral viewing windows in accordance with various embodiments.

Having generally described an exemplary process for providing distributed playback of a 360-degree video in a plurality of viewing windows, additional details regarding various steps and concepts in the flowchart of FIG. 3 are now disclosed. FIG. 4 depicts an exemplary user interface generated by the UI component 108 (FIG. 1) for providing distributed playback in accordance with some embodiments. As shown, the user interface 400 includes a main viewing window 402 and two peripheral viewing windows 404, 406 in accordance with various embodiments. In the configuration shown, the peripheral viewing windows 404, 406 are disposed within the main viewing window 402. However, the peripheral viewing windows 404, 406 can also be disposed outside of the main viewing window 402.

Figure 5:
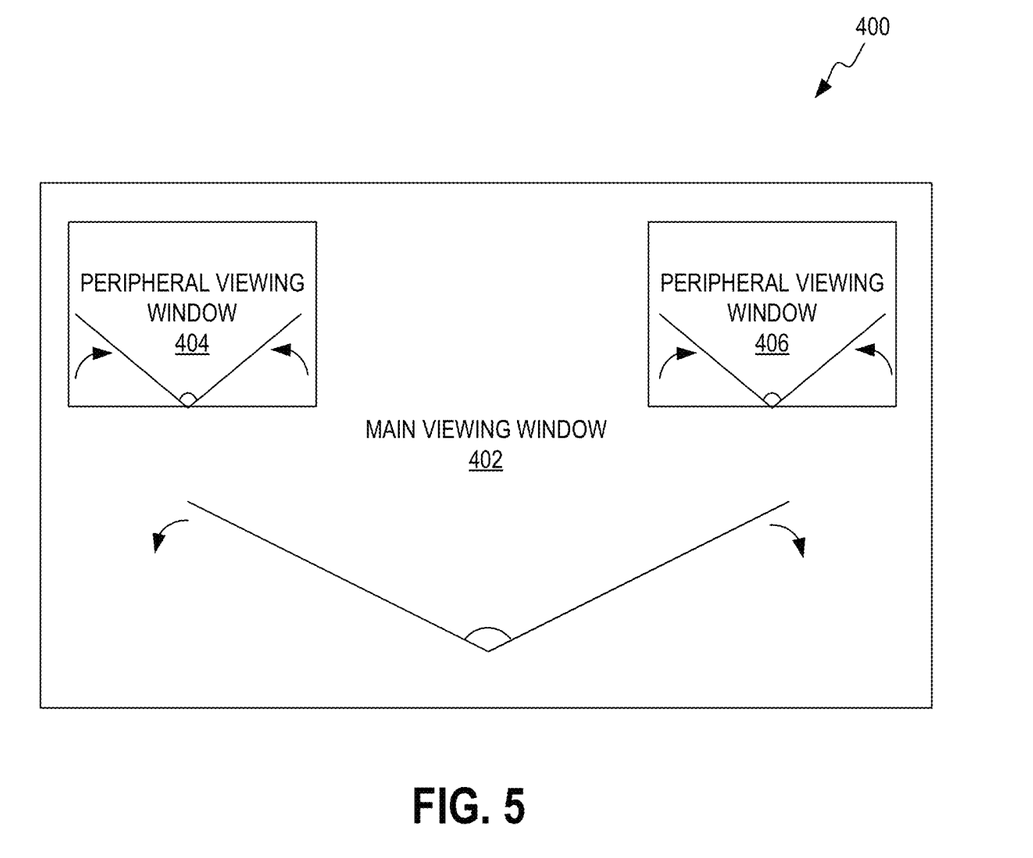
FIGS. 5-6 illustrate how adjusting the field of view angle of the main viewing window affects the field of view angles of the peripheral windows in accordance with various embodiments.
Figure 6:
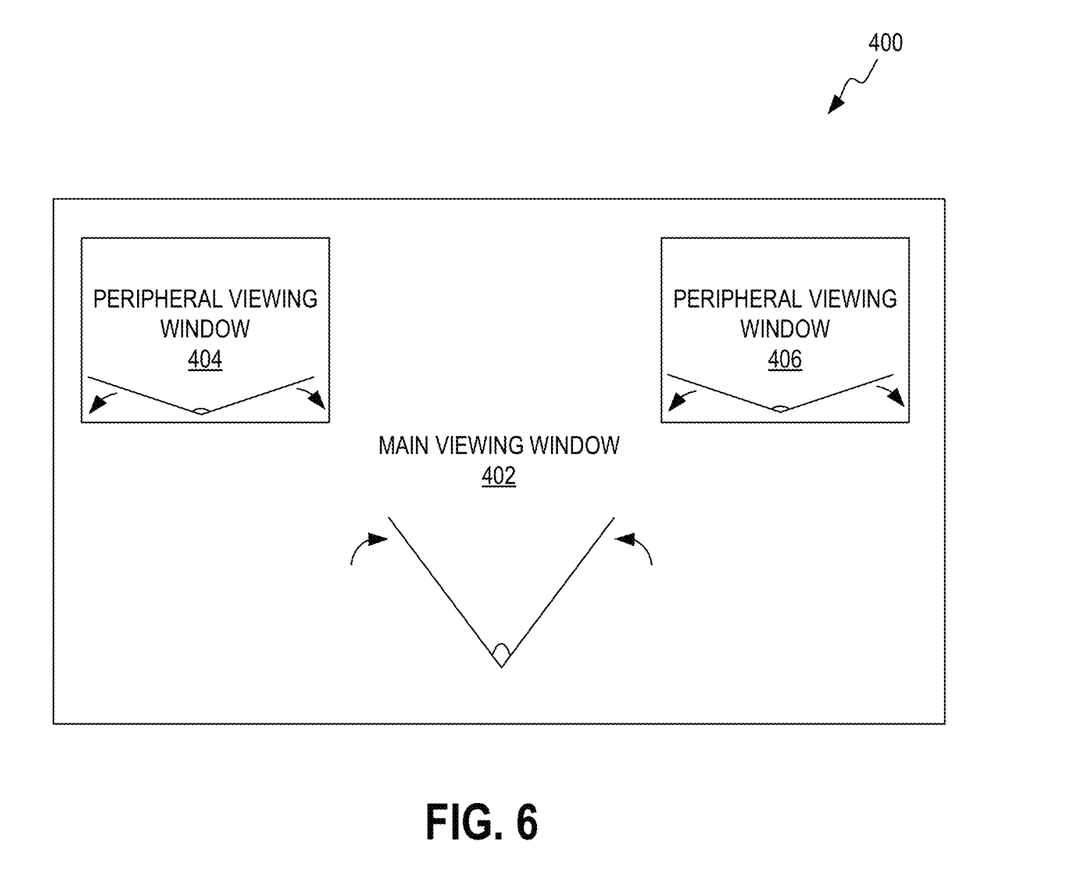

As shown in FIG. 5, as the user increases the field of view angle for the main viewing window 402, the computing device 102 decreases the field of view angles for the peripheral viewing windows 404, 406 accordingly. Similarly, as shown in FIG. 6, as the user decreases the field of view angle for the main viewing window 402, the computing device 102 increases the field of view angles for the peripheral viewing windows 404, 406 accordingly. Notably, any adjustment of the field of view angle in the main viewing window 402 by the user triggers automatic adjustment of the field of view angles for the peripheral windows 404, 406 based on a predefined ratio between the field of view angle of the main viewing window 402 and the combined field of view angle of the peripheral windows 404, 406. Furthermore, a ratio between the field of view angles of the peripheral windows 404, 406 can be specified.

Figure 7A:
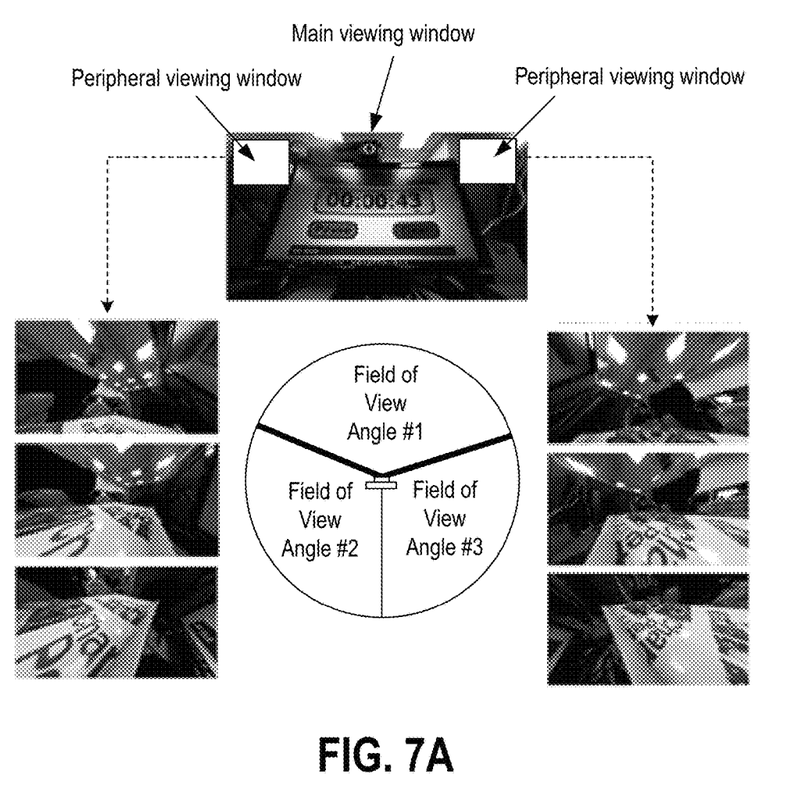
FIG. 7A is an example of a main viewing window and two peripheral viewing windows displaying the content of a 360-degree video in accordance with various embodiments.

FIG. 7A is an example of a main viewing window and two peripheral viewing windows displaying the content of a 360-degree video. Note that the respective field of view angles for the two peripheral viewing windows are not limited to being the same as the user can configure each viewing window to have a unique field of view angle.

Figure 7B:
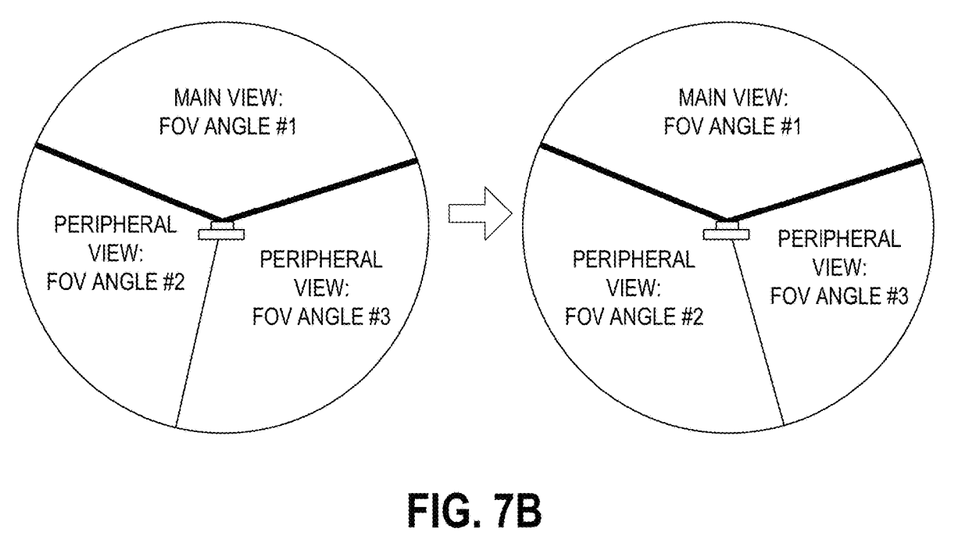
FIG. 7B is an example where the field of view angles for the peripheral windows are modified and where the field of view angle for the main viewing window remains fixed in accordance with various embodiments.

FIG. 7B is an example where the field of view angles for the peripheral windows are modified and where the field of view angle for the main viewing window remains fixed in accordance with various embodiments. In some embodiments, a modified field of view angle for one of the peripheral windows is received, and as shown in FIG. 7B, the field of view angle for the remaining peripheral window is automatically adjusted based on the modified field of view angle and the ratio. Furthermore, in accordance with such embodiments, the field of view angle for the main viewing window remains fixed.

In some embodiments, a modified field of view angle for one of the peripheral windows is received in either the vertical direction or in the horizontal direction. In response to receiving the modified field of view angle in the vertical direction, the field of view angles for the remaining peripheral windows is automatically adjusted in the vertical direction based on the modified field of view angle and the ratio. In accordance with such embodiments, the field of view angle for the main viewing window remains fixed.

Generally, the main viewing window provides the user with a front view while the peripheral windows allow the user to view content to the side or behind the user. For some embodiments, a modified field of view angle for one of the peripheral windows is received in either the vertical direction or in the horizontal direction. When the user modifies the right peripheral viewing window in either the vertical direction or in the horizontal direction, the field of view angles for the main viewing window and left peripheral viewing window remain fixed. When the user modifies the left peripheral viewing window in either the vertical direction or in the horizontal direction, the field of view angles for the main viewing window and right peripheral viewing window remain fixed.

Figure 8A:
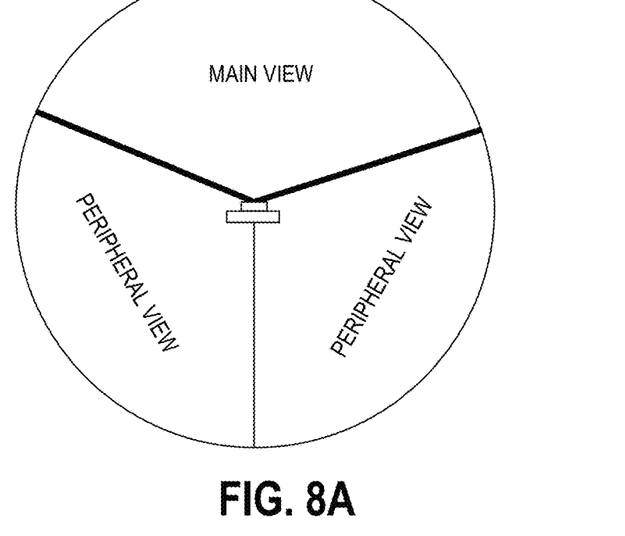
FIGS. 8A and 8B illustrate various configurations relating to the field of views that may be provided by the main viewing window and peripheral windows in accordance with various embodiments.
Figure 8B:
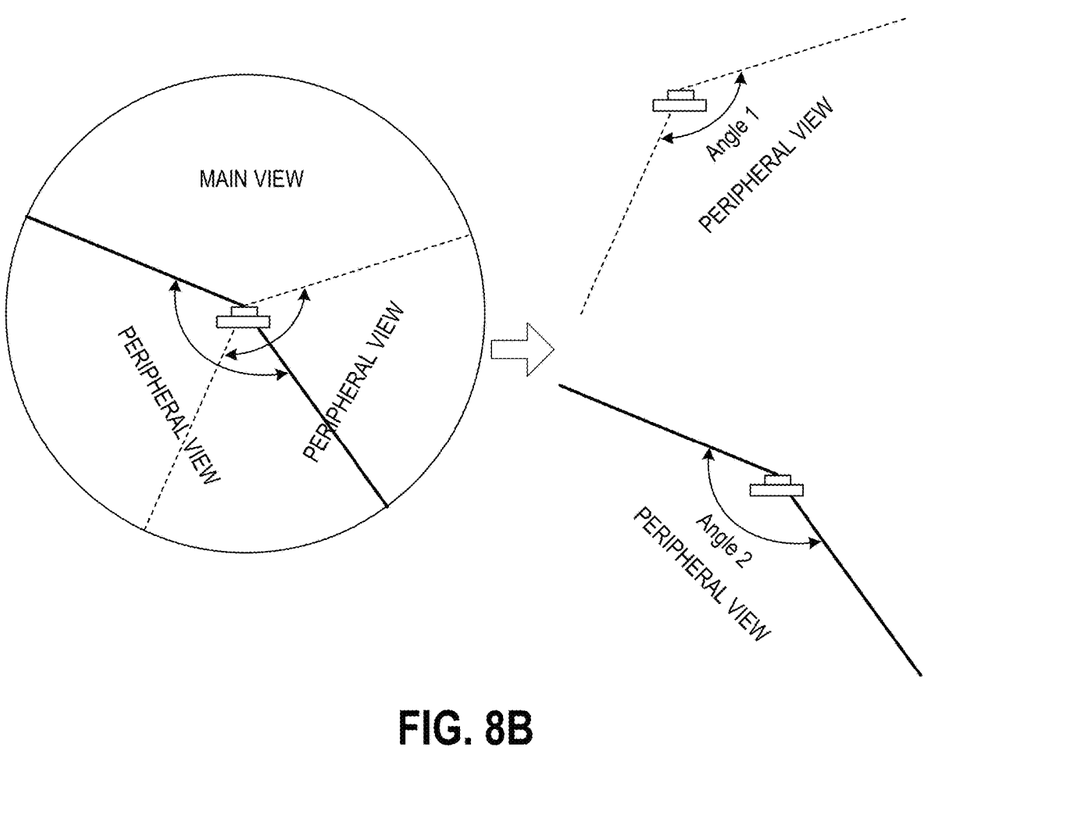

FIGS. 8A and 8B illustrate various configurations relating to the field of views that may be provided by the main viewing window and peripheral windows in accordance with various embodiments. The user may specify the number of peripheral viewing windows that the user wishes to utilize during playback. For example, a user may elect to utilize a main viewing window and two peripheral windows. For this example, suppose that the user specifies that the main viewing window displays a portion of the 360-degree video according to a field of view angle of 180 degrees while the remaining two peripheral windows each displays a field of view angle of 90 degrees, thereby providing the user with a complete 360 degree view, as shown in FIG. 8A. However, it should again be noted that the combined field of view provided by the main viewing window and the two peripheral windows is not limited to 360 degrees and may provide a combined field of view of less than 360 degrees or greater than 360 degrees (see FIG. 8B).

As shown in FIG. 8B, the field of views of the peripheral windows and the main viewing window may overlap, where the values for Angle 1 and Angle 2 may be the same or may differ. Note also that for some embodiments, the field of view angle is specified for the horizontal direction where the vertical field of view angle may be set to a default value for the main viewing window and for the peripheral viewing windows. However, the field of view angle may be set for the vertical direction and/or the horizontal direction.

In accordance with some embodiments, the field of view angles for the viewing windows are automatically adjusted in either the horizontal direction or in the vertical direction based on user input, where the user input may comprise, for example, manipulation of a user interface component, a gesture performed on a touchscreen, and so on. For example, the user input may cause the viewer's various vantage points of the 360-degree video to rotate by 120 degrees. For example, user input (e.g., a tap, an indicator, or pressing of an arrow key) received in the display area of the left peripheral window may cause the 360-degree video displayed in the main peripheral window and the right peripheral window to rotate by 120 degrees. As another example, user input (e.g., a tap, an indicator, or pressing of an arrow key) received in the display area of the main peripheral window may cause the 360-degree video displayed in the left peripheral window and the right peripheral window to rotate by 120 degrees. As another example, user input (e.g., a tap, an indicator, or pressing of an arrow key) received in the display area may cause the 360-degree video displayed in the main peripheral window, the left peripheral window, and the right peripheral window to rotate by 120 degrees.

Figure 9:
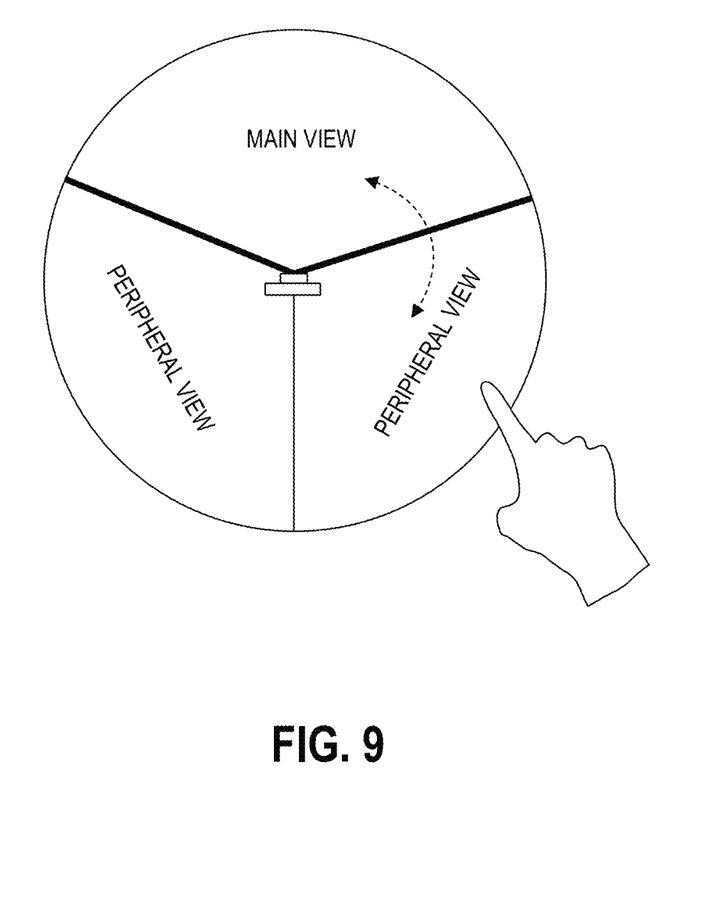
FIG. 9 is an example where the content of the main viewing window is switched with the content of one of the peripheral windows in accordance with various embodiments.

In accordance with some embodiments, the content may be switched between the main viewing window and in the peripheral window, where the content displayed in the main viewing window is switched with the content displayed in the peripheral window in response to user input (e.g., manipulation of a user interface component, a gesture performed on a touchscreen interface). For example, as shown in FIG. 9, user input (e.g., a tap, an indicator, or swipe gesture) received in the display area of the user interface corresponding to the first peripheral window will cause the content in that peripheral window to be switched with the content display in the main viewing window.

In accordance with some embodiments, the system is configured to detect the presence of an object of interest (e.g., a vehicle, face, or flower) in the content displayed in one of the peripheral windows. When the system detects the presence of the object of interest, the system switches the content displayed in the peripheral window to the main viewing window upon receiving user input so that the object of interest is displayed in the main viewing window. The system may be further configured to automatically adjust the field of view such that the object of interest is centrally located within the main viewing window. In accordance with some embodiments, no user input is required for switching the content between the peripheral window and the main viewing window.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device for providing distributed playback of 360-degree video in a plurality of viewing windows, comprising:
   receiving a 360-degree video;
   receiving a field of view angle for a main viewing window from a user;
   generating a user interface comprising the main viewing window and a plurality of peripheral viewing windows, the plurality of peripheral viewing windows each having a corresponding field of view angle; and
   executing distributed playback of the 360-degree video in the main viewing window and the plurality of peripheral viewing windows based on the field of view angles of the main viewing window and the plurality of peripheral viewing windows, wherein the distributed playback of the 360-degree video in the main viewing window and the plurality of peripheral viewing windows displays the 360-degree video from different perspectives at a same time.

2. The method of claim 1, wherein a number of the plurality of peripheral windows and the field of view angles corresponding to the plurality of peripheral viewing windows are specified by the user.

3. The method of claim 1, wherein the field of view angles corresponding to the plurality of peripheral viewing windows are automatically assigned based on a ratio between a field of view angle of the main viewing window and a combined field of view angle of the peripheral viewing windows.

4. The method of claim 3, wherein the ratio is specified by the user.

5. The method of claim 3, further comprising:
receiving a modified field of view angle for the main viewing window, the modified field of view angle corresponding to a change in the field of view in one of a horizontal direction or a vertical direction; and
automatically adjusting the field of view angles for the peripheral viewing windows based on the modified field of view angle and the ratio.

6. The method of claim 3, further comprising:
receiving a modified field of view angle for one of the plurality of peripheral windows; and
automatically adjusting the field of view angles for the remaining peripheral windows of the plurality of peripheral viewing windows based on the modified field of view angle and the ratio, wherein the field of view angle for the main viewing window remains fixed.

7. The method of claim 3, further comprising:
receiving a modified field of view angle for one of the plurality of peripheral windows in one of a vertical direction and a horizontal direction; and
responsive to receiving the modified field of view angle in the vertical direction, automatically adjusting the field of view angles for the remaining peripheral windows of the plurality of peripheral viewing windows in the vertical direction based on the modified field of view angle and the ratio, wherein the field of view angle for the main viewing window remains fixed.

8. The method of claim 1, wherein the peripheral viewing windows have different field of view angles.

9. The method of claim 1, wherein the peripheral viewing windows have the same field of view angles, wherein the field of view angles of the peripheral viewing windows are set based on a default value selected by the computing device.

10. A system, comprising:
a memory device storing instructions; and
a processor coupled to the memory device and configured by the instructions to at least:
receive a 360-degree video;
receive a field of view angle for a main viewing window from a user;
generate a user interface comprising the main viewing window a the plurality of peripheral viewing windows, a plurality of peripheral viewing windows each having a corresponding field of view angle; and
execute distributed playback of the 360-degree video in the main viewing window and the plurality of peripheral viewing windows based on the field of view angles of the main viewing window and the plurality of peripheral viewing windows, wherein the distributed playback of the 360-degree video in the main viewing window and the plurality of peripheral viewing windows displays the 360-degree video from different perspectives at a same time.

11. The system of claim 10, wherein a number of the plurality of peripheral windows and the field of view angles corresponding to the plurality of peripheral viewing windows are specified by the user.

12. The system of claim 10, wherein the field of view angles corresponding to the plurality of peripheral viewing windows are automatically assigned based on a ratio between a field of view angle of the main viewing window and a combined field of view angle of the peripheral viewing windows.

13. The system of claim 12, wherein the ratio is specified by the user.

14. The system of claim 12, wherein the processor is further configured to:
receive a modified field of view angle for the main viewing window, the modified field of view angle corresponding to a change in the field of view in one of a horizontal direction or a vertical direction; and
automatically adjust the field of view angles for the peripheral viewing windows based on the modified field of view angle and the ratio.

15. The system of claim 10, wherein the peripheral viewing windows have different field of view angles.

16. The system of claim 10, wherein the peripheral viewing windows have the same field of view angles, wherein the field of view angles of the peripheral viewing windows are set based on a default value selected by the processor.

17. A non-transitory computer-readable storage medium storing instructions to be implemented by a computing device having a processor, wherein the instructions, when executed by the processor, cause the computing device to at least:
receive a 360-degree video;
receive a field of view angle for a main viewing window from a user;
generate a user interface comprising the main viewing window and a plurality of peripheral viewing windows, the plurality of peripheral viewing windows each having a corresponding field of view angle; and
execute distributed playback of the 360-degree video in the main viewing window and the plurality of peripheral viewing windows based on the field of view angles of the main viewing window and the plurality of peripheral viewing windows, wherein the distributed playback of the 360-degree video in the main viewing window and the plurality of peripheral viewing windows displays the 360-degree video from different perspectives at a same time.

18. The non-transitory computer-readable storage medium of claim 17, wherein a number of the plurality of peripheral windows and the field of view angles corresponding to the plurality of peripheral viewing windows are specified by the user.

19. The non-transitory computer-readable storage medium of claim 17, wherein the field of view angles corresponding to the plurality of peripheral viewing windows are automatically assigned based on a ratio between a field of view angle of the main viewing window and a combined field of view angle of the peripheral viewing windows.

20. The non-transitory computer-readable storage medium of claim 19, wherein the ratio is specified by the user.

21. The non-transitory computer-readable storage medium of claim 19, wherein the processor is further configured by the instructions to:

receive a modified field of view angle for the main viewing window, the modified field of view angle corresponding to a change in the field of view in one of a horizontal direction or a vertical direction; and automatically adjust the field of view angles for the peripheral viewing windows based on the modified field of view angle and the ratio.

22. The non-transitory computer-readable storage medium of claim 17, wherein the peripheral viewing windows have the same field of view angles, wherein the field of view angles of the peripheral viewing windows are set based on a default value selected by the computing device.

* * * * *